G. V. PIOTROWSKY.
AIR PUMP.
APPLICATION FILED JUNE 19, 1915.

1,257,527.

Patented Feb. 26, 1918.
2 SHEETS—SHEET 1.

Inventor
Gregory Victor Piotrowsky
by Geyer & Popp Attorneys

G. V. PIOTROWSKY.
AIR PUMP.
APPLICATION FILED JUNE 19, 1915.
1,257,527.
Patented Feb. 26, 1918.
2 SHEETS—SHEET 2.
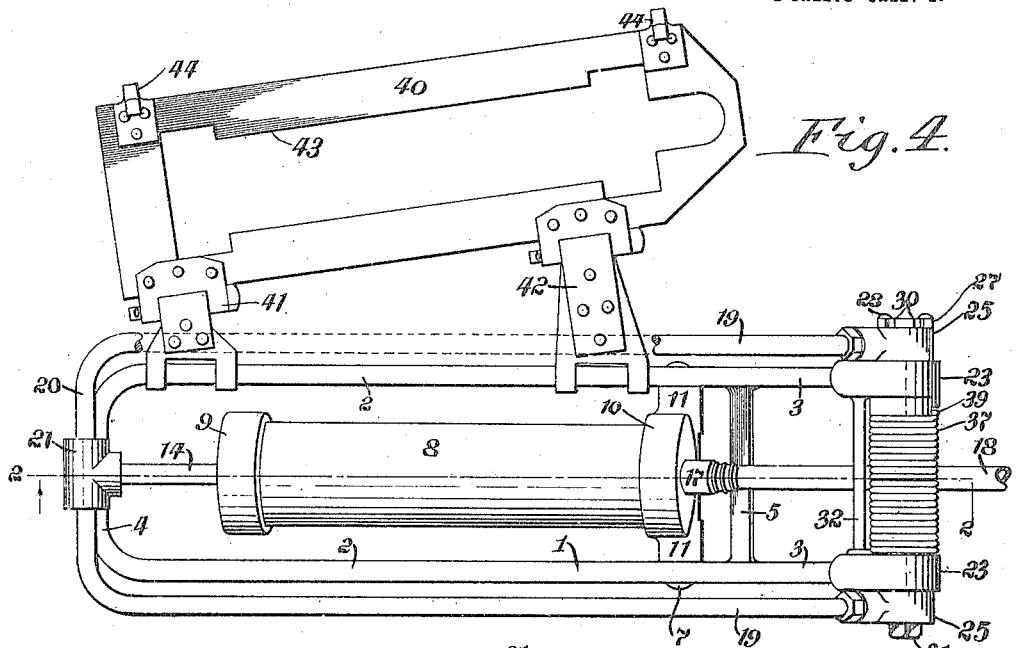
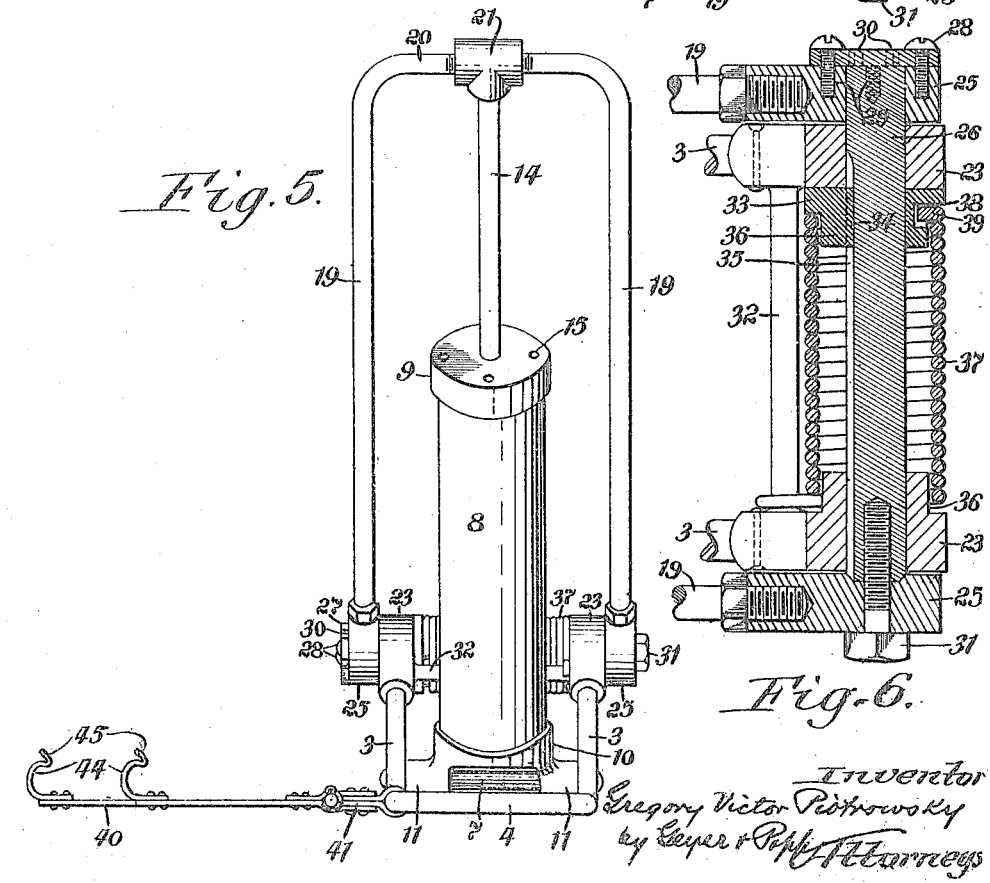
Inventor
Gregory Victor Piotrowsky
by Geyer & Popp Attorneys

UNITED STATES PATENT OFFICE.

GREGORY VICTOR PIOTROWSKY, OF BUFFALO, NEW YORK.

AIR-PUMP.

1,257,527. Specification of Letters Patent. Patented Feb. 26, 1918.

Application filed June 19, 1915. Serial No. 35,130.

*To all whom it may concern:*

Be it known that I, GREGORY VICTOR PIOTROWSKY, a citizen of Russia, residing at Buffalo, in the county of Erie and State of New York, have invented new and useful Improvements in Air-Pumps, of which the following is a specification.

This invention relates to a manually operated foldable air pump adapted to be worked solely by the feet, the purpose being to provide a semi-automatic powerful and strong, yet light pump, that requires a minimum of space in an automobile or aeroplane kit or other storage space.

Figure 1:
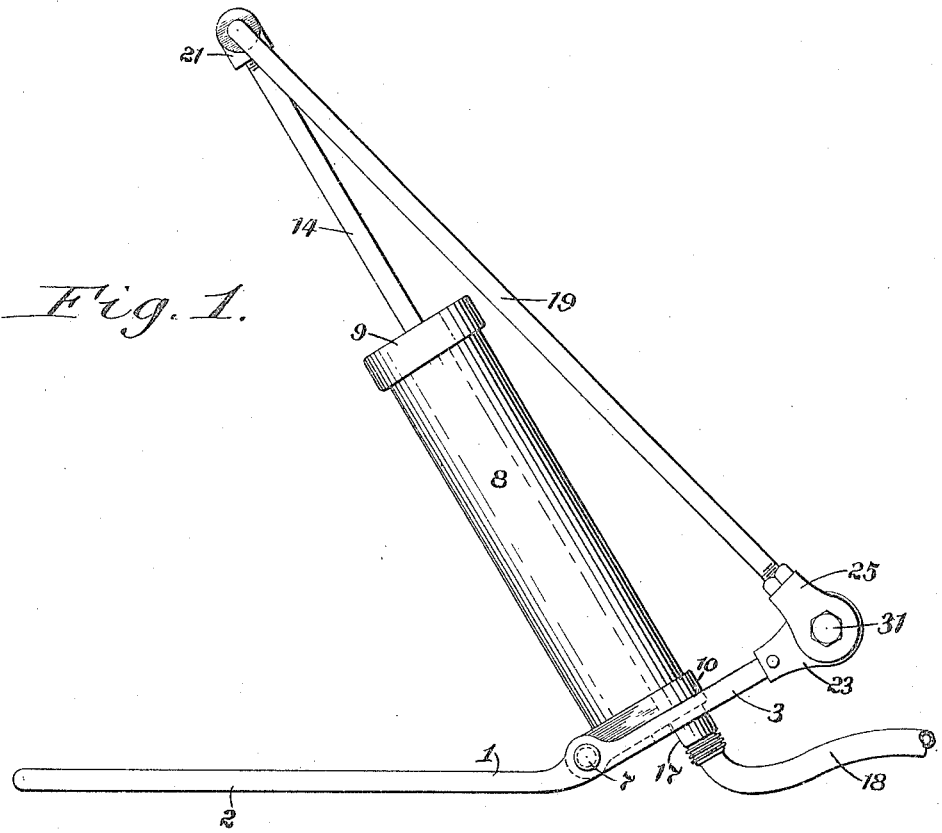
Figure 2:
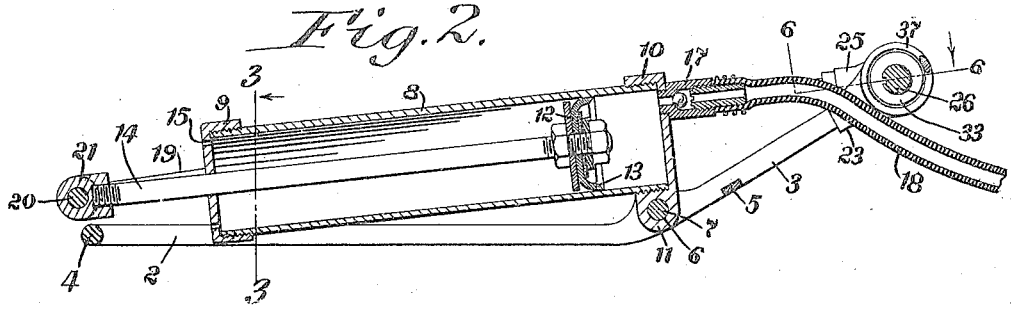
Figure 3:
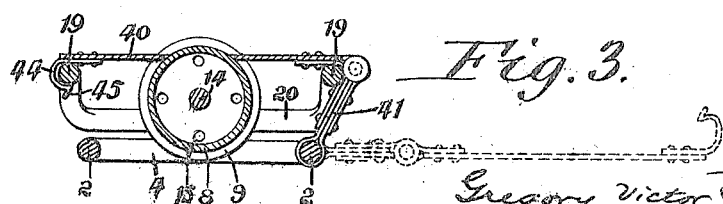

In the accompanying drawings:

Figure 1 is a side elevation of the pump in its unfolded position. Fig. 2 is a vertical longitudinal section of the same showing the parts in the position, which they occupy at the end of a power stroke, the section being taken on line 2—2, Fig. 4. Fig. 3 is a transverse section taken on line 3—3, Fig. 2, with the foot rest in its folded position. Fig. 4 is a top plan view of the pump with the foot lever and associated parts depressed. Fig. 5 is a front elevation of the pump showing the treadle and associated parts elevated. Fig. 6 is a fragmentary horizontal section, on an enlarged scale, taken on line 6—6, Fig. 2.

Similar characters of reference indicate corresponding parts throughout the several views.

1 represents the base of the pump which extends substantially horizontal and longitudinally and which may be variously constructed, but as shown preferably comprises two longitudinal side bars, each of which has a horizontal front part 2 and an upwardly bent rear part 3, a front cross bar 4 connecting the front ends of the side bars and a transverse stop bar 5 connecting the upwardly bent rear parts 3 of the side bars. In enlarged portions of these side bars adjacent to the bends therein are formed two holes 6 which receive a transverse pivot pin 7, which is fixed to the side bars. 8 represents the cylindrical body of the pump barrel which is provided at its front end with a front head 9 and at its rear end with a rear head 10. The latter is provided on its underside with two pivot lugs 11 which are journaled on the pivot pin 7 so that the pump barrel rotates about the same in a vertical plane.

Any suitable air valve and plunger used for various purposes may be employed in connection with the barrel, but those shown are typical and effective and therefore preferred. A plunger 12 is provided with a flexible plunger cup 13 which is secured to the inner end of a plunger rod 14 which extends forwardly through the front head of the barrel. This head is provided with a plurality of air inlet ports or openings 15 arranged around the plunger rod. A discharge air port 16 is located in the upper portion of the rear barrel head communicating with a check valve 17 secured to said barrel head, and an outlet tube 18 extends from said check valve for conducting the air from said valve to the space to be inflated.

The reciprocating movement of the plunger in the barrel is preferably produced by means of a vertically swinging foot lever which is pivotally connected at its opposite ends with the base and plunger rod so that a rising and falling movement of the foot lever imparts a similar movement to the pump barrel and plunger rod, the several axes of the pivotal connections between the base, barrel, plunger rod and foot lever being arranged relatively to each other so that these elements together form a triangle which when folded or unfolded causes a reciprocating movement of the plunger in the barrel.

It is to be noted that the upwardly bent portions of the base side bars are not essential though desirable, as they limit the downward movement of the foot lever within that range in which a given travel of said foot lever causes a relatively large movement of the pump plunger.

In its preferred form, this foot lever comprises two longitudinal side bars 19 and a cross bar 20 connecting the front ends of said side bars. On the central part of the cross bar 20 is pivotally mounted a swivel head 21 which connects with the front or outer end of the plunger rod.

The foot lever is pivotally connected at its rear end with the rear end of the base and in its preferred form this pivotal connection is produced as follows as best shown in Fig. 6:

23, 23 represent two bearings arranged at the rear ends of the base side bars and 25, 25 two pivot eyes secured to the rear ends of the foot lever side bars and arranged adjacent to the outer sides of said base bearings, respectively. A transverse pivot pin 26 passes horizontally through the base bearings and passes at one end through the eye 24 of the foot lever and is secured to the latter so as to be capable of rotary adjustment relatively to the foot lever, this being preferably accomplished by means of a head 27 arranged on the last mentioned end of the pivot pin 26 and connected with the outer side of the adjacent foot lever eye 24 by means of two screws 28 which may engage with either pair of four tapped holes 29 adapted to receive the threaded inner ends of said screws. The periphery of the pin head 27 is preferably provided with a number of notches 30, so that the prongs of a spanner wrench may conveniently be inserted in the same for turning the pivot pin. The other foot lever eye 25 is secured to the opposite end of the pivot pin by means of a cap bolt 31 passing through said eye and engaging said pivot pin, said bolt being provided on its outer end with a head adapted to engage the outer surface of the eye.

Arranged between said base bearings is the transverse spacing or abutment bar 32 secured to the inner sides of the same. Surrounding the pivot pin 26 and arranged adjacent to the inner surface of the base bearing 22 is a torque collar 33 mounted on the pivot pin and provided on one side of its bore with an inwardly projecting spline 34 engaging a keyway 35 on the pivot pin, so that the collar is caused to turn with said pin but is capable of sliding thereon. This collar is provided with a reduced inner end 36 as is likewise the inner end of the base bearing 23 at the opposite end of the pin and a spiral torque spring 37 is mounted with its end coils on said reduced ends. A radial recess 38 formed in the reduced portion of the torque collar receives a hook 39 at one end of the torque spring while the opposite end of this spring bears against the transverse spacing bar 32.

Although a spiral spring has been shown for raising the lever it is to be understood that any other suitable form of spring may be employed for this purpose.

Connected with one longitudinal edge of the pump base is a foot rest 40 which, when the pump is being operated, rests on the ground or other support in the same plane as the base so that one foot of the operator may be placed thereon and the pump firmly held in place while the other foot is treading the foot lever. This foot rest may be folded over the foot lever and secured thereto when the pump is not in use so as to make a more compact and portable pump. The connection between said foot rest and the base is preferably effected by two hinge links 41, 42 that swing transversely relative to the base, one end of each being pivoted to one of the side bars 2 of the pump base and the other pivoted to one longitudinal edge of the foot rest. The front link 41 is shorter than the rear link 42 and the axes of the pivotal connections between opposite ends of these links and the base and foot rest diverge rearwardly so that the foot rest can be folded properly over the foot lever when it is desired to pack the pump for storage.

An aperture 43 is provided in the foot rest to permit the barrel to project partially through the same when the pump is folded. Two spring catches 44 are arranged on the free longitudinal edge of the foot rest opposite the links so that when the foot rest is folded over the foot lever, the inclined faces 45 of said catches cause the same to first spread outwardly and then when the foot rest has been fully depressed, these catches engage the adjacent side bar of the foot lever, as shown in Fig. 3.

To operate the pump the foot rest 40 is spread out flat on the ground and one foot placed on it to secure the pump. The other foot is placed on the outer end of the foot lever which is then depressed against the tension of the torque spring 37 to the positions shown in Figs. 2 and 4, thereby forcing air past the check valve 17 into the delivery tube 18 and sucking in air through the air inlet ports 15 into the front part of the barrel. When the pressure on the front end of the foot lever is released said torque spring elevates said lever and the plunger is moved backwardly, thereby closing the said check valve and also causing the air in the front end of the barrel to pass the plunger to the rear end of the barrel, this foot operation being repeated continuously while the pump is in use. When it is desired to pack the pump away, the foot lever is depressed, the hinged foot rest turned up and over said lever and the catches 44 snapped under the adjacent edge of the lever, thereby holding the latter in its depressed position. It will be apparent that the barrel may be of comparatively large diameter, because the ability to apply a heavy force permits a large plunger to work against a heavy pressure head. Furthermore, the pump is light, it can be constructed at low cost, as it involves no accurate machine work, and it has no delicate parts which are liable to get out of order.

I claim as my invention:

1. An air pump comprising a base adapted to rest on a support, a barrel pivoted to swing vertically at one end on said base between the front and rear ends of the latter, a plunger reciprocable in said barrel, a plunger rod connected with said plunger, a foot lever having its free end pivotally connected with said plunger rod, means for pivotally connecting said lever with the base comprising two bearings arranged at the rear end of said base, two pivot eyes arranged on said lever adjacent to the outer sides of said bearings, a pivot pin journaled in said bearings and having one of its ends extending through one of said eyes and secured thereto, a bolt passing through the other eye of said lever and secured to the opposite end of said pivot pin, and means for yieldingly holding said lever in an elevated position comprising a collar splined on said pivot pin, and a spiral spring surrounding said pivot pin and engaging its opposite ends with said collar and said base.

2. An air pump comprising a base adapted to rest on a support, a foot lever pivoted on the base, a barrel and plunger interposed between said base and lever, and a foot rest foldably connected with said base and adapted to engage either with a support or to be folded over said lever and barrel.

3. An air pump comprising a base adapted to rest on a support, a foot lever pivoted on the base, a barrel and plunger interposed between said base and lever, a foot rest adapted to engage said support on one side of said base, links connecting the foot rest at one of its longitudinal edges with the adjacent longitudinal edge of the base, said foot rest being adapted to be unfolded and lie on said support in the same plane as said base or to be folded over the top of said lever and barrel in a plane parallel with the lever, and spring catches arranged on the opposite longitudinal edge of the foot rest and adapted to engage with that side of the lever opposite to that which is adjacent to said links.

GREGORY VICTOR PIOTROWSKY.

Copies of this patent may be obtained for five cents each, by addressing the "Commissioner of Patents. Washington, D. C."